(12) United States Patent
Ernst et al.

(10) Patent No.: US 6,985,844 B1
(45) Date of Patent: Jan. 10, 2006

(54) METHOD FOR GENERATING A NETWORK

(75) Inventors: Volker Ernst, Wermelskirchen (DE); Bjoern Werther, Bonn (DE); Manfred Werther, Ascheffel (DE); Frank Wille, Mechernich (DE); Roman-Emanuel Zgoll, Meckenheim (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/341,232

(22) PCT Filed: Jan. 5, 1998

(86) PCT No.: PCT/EP98/00027

§ 371 (c)(1),
(2), (4) Date: Oct. 25, 1999

(87) PCT Pub. No.: WO98/31158

PCT Pub. Date: Jul. 16, 1998

(30) Foreign Application Priority Data

Jan. 6, 1997 (DE) ............................... 197 00 148

(51) Int. Cl.
*G06F 13/10* (2006.01)
(52) U.S. Cl. ........................ 703/21; 703/13; 709/200; 709/239; 709/224; 701/117; 706/45; 706/1; 706/2
(58) Field of Classification Search .................. 703/2, 703/20, 21, 13; 345/440, 634; 707/10; 370/400, 228; 706/1
See application file for complete search history.

(56) References Cited

U.S. PATENT DOCUMENTS 4,797,882 A * 1/1989 Maxemchuk ............... 370/406
4,847,788 A * 7/1989 Shimada ..................... 345/634
4,979,118 A * 12/1990 Kheradpir ................... 701/117

(Continued)

FOREIGN PATENT DOCUMENTS

EP          0 537 048         4/1993

OTHER PUBLICATIONS

"Distributed Algorithms for Finding Center and Mediums in Network", E. Korach, ACM Transactions 0164-0925/84/0700-0380, vol. 6, No. 3, Jul. 1984.*

(Continued)

*Primary Examiner*—Jean R. Homere
*Assistant Examiner*—Fred Ferris
(74) *Attorney, Agent, or Firm*—Kenyon & Kenyon

(57) ABSTRACT

A method for generating a network, in particular a telecommunications, water, long-distance heat supply, or power network, the network connecting all users to a main distribution node depending on the existing or definable local needs and requirements of the individual users. A graph is generated which is composed of edges and nodes. The graph includes all technically feasible and/or definable transmission paths of the network. The length and direction of the edges are derived from the real topography of the street segments and definable cable paths of the territory to be supplied by the network. The nodes form the intersections between the edges or streets and/or cable paths. The users are assigned to the graph in such a way that each user is connected to the closest edge or the closest node of the graph by an additional service edge. A tree structure is created by removing unnecessary edges from the graph in such a way that the service edges, edges, and nodes of the tree structure form only one connection between the main distribution node and each user. The load of the edges in the tree structure is determined depending on the needs and requirements of the users.

9 Claims, 8 Drawing Sheets

U.S. PATENT DOCUMENTS

| | | | | |
|---|---|---|---|---|
| 5,270,919 A | * | 12/1993 | Blake et al. | 370/400 |
| 5,276,789 A | * | 1/1994 | Besaw et al. | 345/440 |
| 5,444,694 A | | 8/1995 | Millet et al. | |
| 5,454,073 A | * | 9/1995 | Fukushima et al. | 345/807 |
| 5,608,649 A | * | 3/1997 | Gopinath et al. | 340/14.3 |
| 5,742,795 A | * | 4/1998 | Kussel | 703/2 |
| 5,764,740 A | * | 6/1998 | Holender | 379/112.05 |
| 5,799,153 A | * | 8/1998 | Blau et al. | 709/200 |
| 5,809,282 A | * | 9/1998 | Cooper et al. | 709/226 |
| 5,852,449 A | * | 12/1998 | Esslinger et al. | 345/440 |
| 5,983,068 A | * | 11/1999 | Tomich et al. | 725/32 |
| 6,047,331 A | * | 4/2000 | Medard et al. | 709/239 |
| 6,144,962 A | * | 11/2000 | Weinberg et al. | 345/749 |
| 6,154,736 A | * | 11/2000 | Chickering et al. | 706/45 |
| 6,209,033 B1 | * | 3/2001 | Datta et al. | 709/224 |
| 6,374,202 B1 | * | 4/2002 | Robinson | 703/13 |
| 6,377,543 B1 | * | 4/2002 | Grover et al. | 370/227 |

OTHER PUBLICATIONS

"Hueristic Layout Algorithms for Network Management Presentation Services" G. Kar, IEEE Network, 0890-8044/88/0011-0029 1988.*

"A Quantitative Comparison of Graph-Based Models for Internet Topography" E. Zegura, IEEE/ACM Transactions on Networking, 1063-6692/97, 1997.*

"Planet: A Tool for Telecommunications Network Planning" L. Jereb et al, IEEE 073308716/94, IEEE Journal on Selected Area in Communications, 1994.*

R. Boorstyn et al., "Large-Scale Network Topological Optimization", IEEE Transactions on Communications, vol. COM-25, No. 1, Jan., 1977, pp 29-47.

A. Kershenbaum et al., "MENTOR: An Algorithm for Mesh Network Topological Optimization and Routing", IEEE Transactions on Communications, vol. 39, No. 4, Apr., 1991, pp. 503-513.

L. Jereb et al., "Planet: A Tool For Telecommunications Network Planning and its Applications in Hungary", IEEE Journal of Selected Areas in Communications, vol. 12, No. 7, Sep. 1, 1994, pp 1261-1271.

H. Liu et al., "Optimizing Knowledge-based System Design", Proceedings of the Conference on Artificial Intelligence Application, Miami Beach, Feb. 24-28, 1991, vol. 1, No. Conf. 7, IEEE Feb. 24, 1991, pp. 269-274.

J. Diogo et al., "Dynamic Planning Model for Urban Telephone Networks and its Applications", IEEE Proceedings I, Solid-State & Electron Devices, vol. 136, No. 4, Part 1, Aug. 1989, pp. 283-290.

J. Grassin, "optimalisation Des Reseaux De Transmission De Donnees A Structure Multipoint, programme REMU" Annales De Telecommunication, vol. 27, No. ½, 1972, pp. 11-18.

J. Craveirinha et al., "A Survey of Applications of Mathematical Programming to Circuit-Switched Network Planning Problems", European Transaction on Telecommunications and Related Technologies, vol. 3, No. 5, Sep. 1, 1992, pp. 499-515.

L. Schade et al., "Modellierung, Planung Und Optimierung Von Telekommunikationsnetzen Mit Dem Programmsystem Networks", Nachrichtentechnik Elektronik, vol. 44, No. 3, May 1, 1994, pp. 33-37.

B. Lifshits et al., "Determining the Location of Exchanges and Toll Centers of an Urban Telephone Network with Aid of a Computer", Telecommunications and Radio Engineering, vol. 27/28, No. 8, Aug. 1, 1973.

* cited by examiner

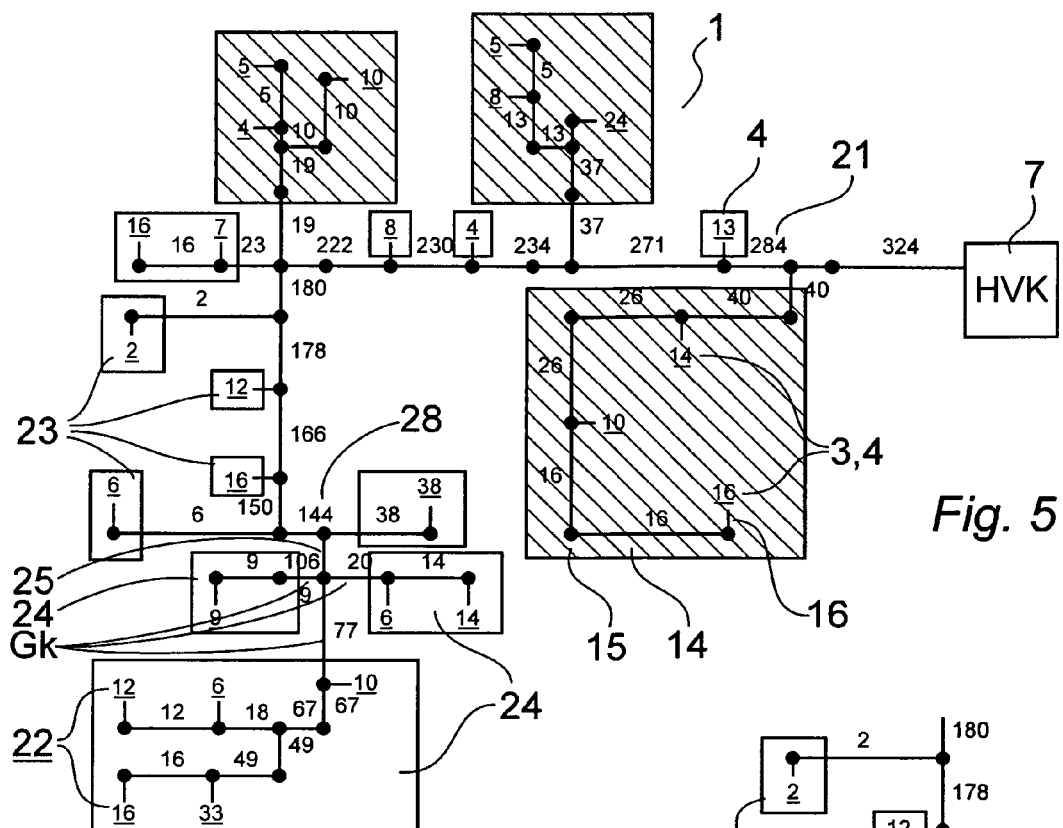
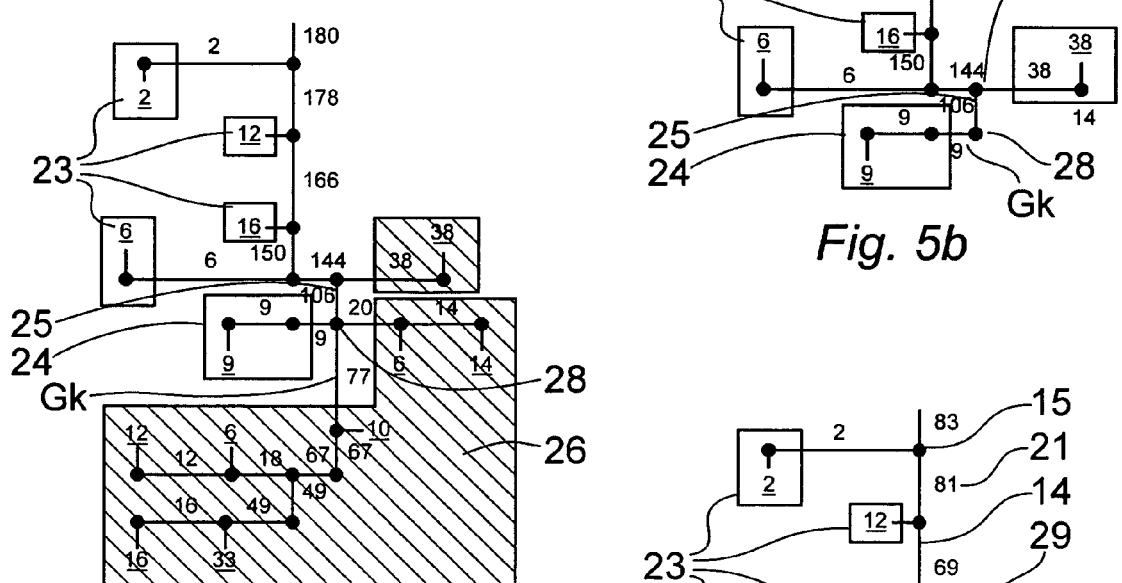
Fig. 5a
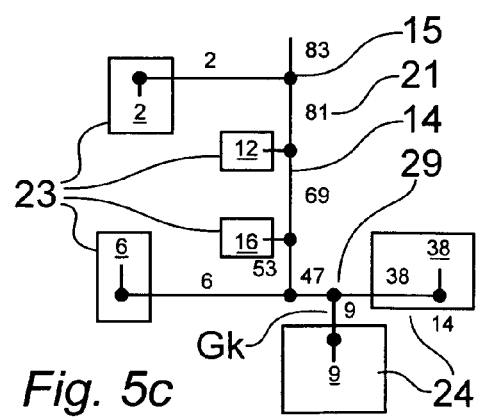
Fig. 5b
Fig. 5c

METHOD FOR GENERATING A NETWORK

FIELD OF THE INVENTION

The present invention relates to a method for generating and optimizing a network, in particular a telecommunications, water, long-distance heat supply, or power network.

BACKGROUND INFORMATION

Supply, telecommunications, or, for example, computer networks are very difficult for a person to set up by hand once they have grown beyond a certain size. When setting up a network, therefore, the most important consideration is its proper functioning. Once the network has been set up, it can be optimized only at points. In most cases, serious errors can no longer be corrected later on.

Depending on the network type and layout, the widest variety of technologies can be used. Network planners usually have multiple components at their disposal for solving a specific network problem. In the case of telecommunication networks, planners must, among other things, decide whether to use a copper or fiber-optic cable for a specific connection. They must also choose among a wide variety of copper and fiber-optic cable types, all of which vary in terms of their capacities, i.e. transmission rates, number of lines per cable, and maximum possible transmission ranges.

Up to now, network plans for telecommunication networks that will provide coverage for a specific territory have almost always been drawn up manually by experienced network planners. As mentioned above, proper network functioning is the primary concern when drawing up such plans. A network that has been technically optimized and has the most cost-effective layout cannot be set up using the currently known network generation methods.

The conventional method for setting up a telecommunications network is described below, only the most important principles being explained. FIG. 1 shows a territory 1 having individual blocks 2 of houses to be supplied from an exchange (HVK) 7. Blocks 2 have individual users 3, whose phone line requirements 4 are indicated. For purposes of illustration, users 3 in this example do not require any services other than phone lines. Blocks 2 are separated from one another by streets 5 and street intersections 6. As shown in FIG. 2, the network planner has divided territory 1 into areas A through E on the basis of the planning rules established in the past by the carrier and of his store of experience, multiple city blocks, such as A1 and A2, usually being combined into one area. These areas are referred to below as cable distribution areas. The territory is divided into cable distribution areas on the basis of the technology to be used and on the basis of the cable typologies defined in the individual countries. The technology determines the maximum and optimum size of the individual cable distribution areas. In the present example, the network planner has selected, e.g., copper cables, it being possible for one copper cable to have different pairings, such as 10, 20, 50, 75, 100, 150 or 200 copper pairs (CuDA). The copper cable transmission range is sufficient for all users, and the maximum capacity of a cable distributor 8 may be 1 00 copper pairs. The network planner then establishes the locations of cable distributors 8 (KVZA–KVZE) from which the distribution cables (VzK) containing the phone lines are run to individual users 3 along the possible routes, i.e. along the sidewalks and underneath intersections 1 1, as shown in FIG. 3. The telephone lines of the particular area, which are bundled into main cables (Hk) 9 are run directly to exchange 7 from cable distributor 8 of the area. If possible, cables 9 are run along existing cable routes of the other areas in order to reduce the cost of laying cables.

As shown in FIG. 2, area A must be supplied with at least 68 phone lines, area B with at least 72 phone lines, area C with at least 78 phone lines, area D with at least 57 phone lines, and area E with at least 49 phone lines. This means that multiple copper distribution cables, whose utilization depends on the number of copper pairs needed as well as on the cable typology, must be laid in the individual areas. For example, a 20-pair copper distribution cable is needed for one side of a city block A1 and a 50-pair copper distribution cable for the other side of the block. Because of the way the cable distribution areas are divided up, this means that the copper distribution cables have different filling ratios [volumetric efficiencies].

The cable distribution areas formed in this manner must now be connected to exchange (HVK) 7 via main cables (Hk) 9. For example, a main cable with a net capacity of 49 copper pairs is needed to supply cable distribution area E. This means that the main cable having the next higher pairing of 50 copper pairs, which is preferably used, is utilized at a rate of up to 98%. The planner now has two choices for running the main cable of area E to exchange 7. He can run the main cable along routes to a cable distributor in an area A or D situated closer to the exchange in order to run the main cable of area E, along with the main cables of other areas, to a main cable having a higher capacity or a different technology, such as fiber optics. The planner can run the main cable of area E to the cable distributor of either area D or A. In the first case, the main cable leading from exchange 7 to the cable distributor of area D must have a minimum capacity of 106 copper pairs (49 copper pairs in area E and 57 copper pairs in area D). In the second case, the main cable leading from exchange 7 to the cable distributor of area A must have a minimum capacity of 117 copper pairs (49 copper pairs in area E and 68 copper pairs in area D). However, since copper cables having a capacity of 117 or 109 copper pairs are not available, the copper cable with the next higher capacity, i.e. 150 copper pairs, must be selected. Using a 150-pair copper cable, the main cable capacity utilization is 70.67% in the first case and 78% in the second case. To select the optimum network version, the cost of both options must now be calculated. This procedure is repeated for all cable distribution areas.

To provide an optimum network design, all possible combinations must obviously be considered when delimiting the areas and routing the main cables. Selecting the wrong edges for the cable distribution areas in the early stages of network planning produces subsequent errors which cannot be corrected later on.

Because it can also take several weeks to set up a large network manually, and networks often must be set up under extreme time pressure, it is usually not possible to develop alternative solutions when defining the areas. The network is therefore not optimized with a view to efficient network utilization and cost minimization.

As a result, the method described above is not likely to enable the network planner to set up the most cost-effective and profitable network variant.

SUMMARY OF THE INVENTION

The object of the present invention is to provide a method which can be used to generate a highly functional, low-cost network having a high level of capacity utilization in the shortest amount of time and with the least amount of work.

According to the present invention, this object is achieved by generating, in a first process step, a graph composed of edges and nodes, the graph including all technically feasible and/or definable network transmission paths, and the length and direction of the edges being derived from the real topography of the street segments and definable cable paths of the territory to be supplied by the network, and the nodes forming the intersections between the edges or streets and/or cable paths; by assigning, in a second process step, the users in the territory to the graph in such a way that each user is connected to the closest edge or the closest node in the graph by an additional service edge; by generating, in a third process step, the most cost-effective tree structure by removing unnecessary edges from the graph so that only one connection between the main distribution node and each user is provided by the edges and nodes in the tree structure; by determining, in a fourth process step, the load carried by the edges in the tree structure according to the user needs and requirements; and by dimensioning and selecting, in a subsequent fifth process step, the technologies to be used for each edge, service edge, and node in the tree structure on the basis of the edge loads calculated in the above described process steps.

The method according to the present invention can be used to advantageously set up a network which is particularly short in length, allowing it to be generated especially economically since the costs of materials and laying the cables are low, network capacity utilization, for another thing, being particularly high, keeping the carrier's costs low. The method can be used, in particular, for telecommunications, water, long-distance heat supply, and power networks. By converting the method to a computer program that can run on a data processing system, the generated network can be easily optimized manually later on because certain transmission paths can be permanently defined for the graph, the method being used to produce a network which routes, for example, the telecommunications equipment, in particular the cables, along these transmission paths.

A complete network plan can be generated very quickly by applying the method multiple times to different network levels, due to the various technologies used for the levels. If a computer is used, for example, for a telecommunication network, the cable types to be laid, as well as their lengths and pairings, are available in a database immediately upon completion of the method, along with the interconnections needed for each node. This makes it possible to very quickly generate a list of costs and materials. Maps for network construction and maintenance can also be created from the network plan data generated.

In the case of water networks, the required pipe types, along with their diameters and gradients, the necessary pumps and their locations, etc., can be determined directly.

One advantage is that all process steps can be easily completed quickly and conveniently using a computer program, making it possible to generate any number of network plans for a territory in a relatively short amount of time. An optimum network plan can be drawn up gradually by making minor changes to the defined street and route layout parameters as well as the costs of materials and laying cables and the technology to be used for a specific network level. However, these parameters can also be defined or selected for each step in generating a network plan, using a batch program or, for example, genetic algorithms or evolutionary strategies. Using a computer makes it possible to optimize a network plan without any subsequent manual work.

Another method of the present invention is directed to generating a network, in particular a telecommunications, water, long-distance heat supply, or power network, the network connecting all users to a main distribution node depending on the existing or definable local needs and requirements of the individual users. A graph is generated composed of edges and nodes. The graph includes all technically feasible and/or definable transmission paths of the network, and the length and direction of the edges are derived from the real topography of the street segments and definable cable paths of the territory to be supplied by the network. The nodes form the intersections between the edges or streets and/or cable paths. The users are assigned to the graph so that each user is connected to the closest edge or the closest node of the graph by an additional service edge. A tree structure is generated by removing unnecessary edges from the graph in such a way that the service edges, edges, and nodes of the tree structure form only one connection between the main distribution node and each user. The load of the edges in the tree structure is determined depending on the needs and requirements of the users.

The method according to the present invention is explained in greater detail below in its individual process steps on the basis of drawings illustrating, by example, the setting up of a telecommunications network.

BRIEF DESCRIPTION OF THE DRAWINGS

FIG. 5 shows the territory having cable distribution sub-areas created according to the present invention.

FIG. 5a shows a section of the territory 1 with two cable distribution sub-areas being combined to form one cable distribution area.

FIG. 5b shows a first section of FIG. 5a, with the cable distribution area being separated from the tree structure by two limit edges.

FIG. 5c shows a second section of FIG. 5a, with the limit edge of the cable distribution sub-area being connected to a closest node with a particular requirement.

DETAILED DESCRIPTION

Figure 1:
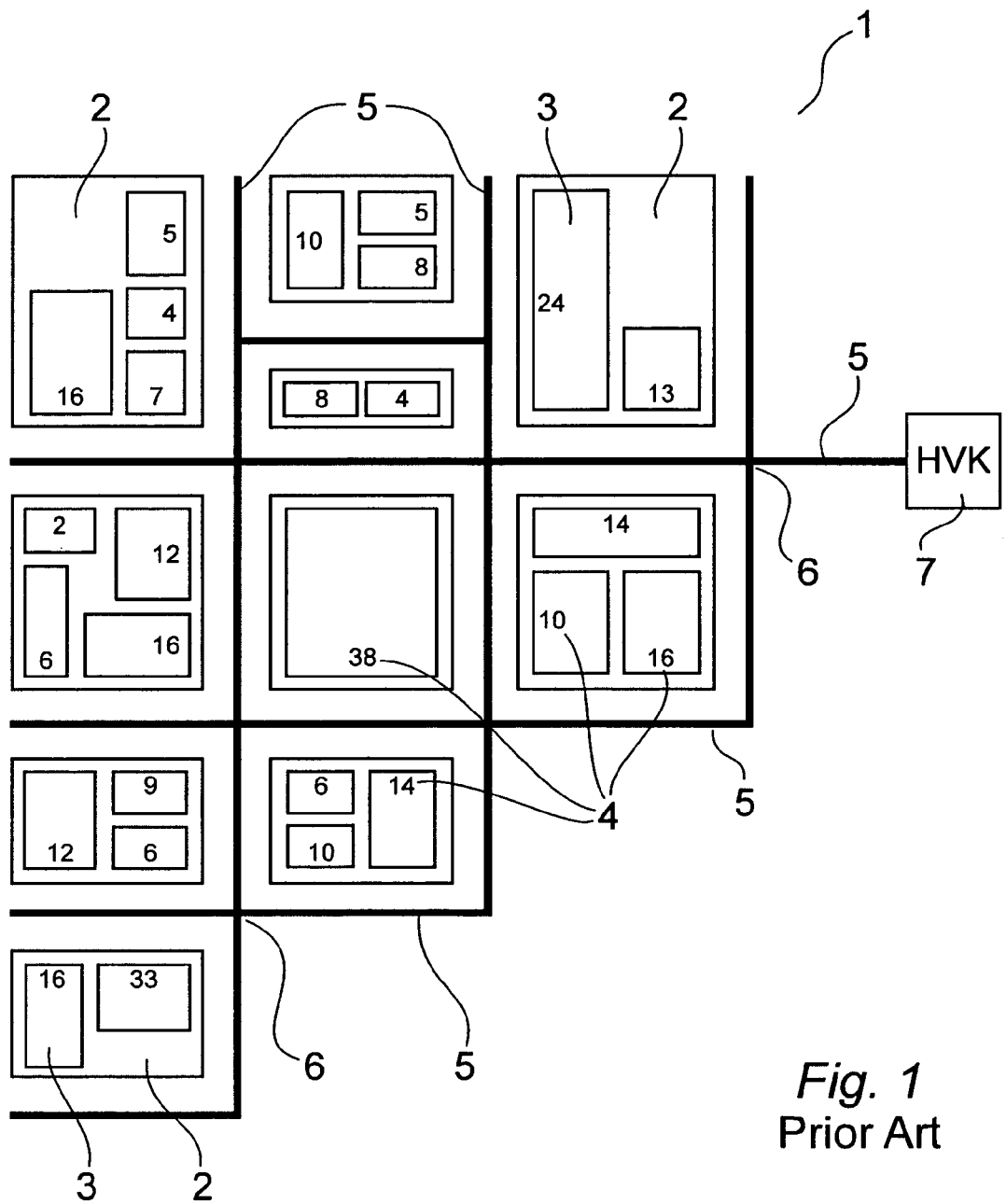
FIG. 1 shows a territory having individual users arranged along streets.
Figure 2:
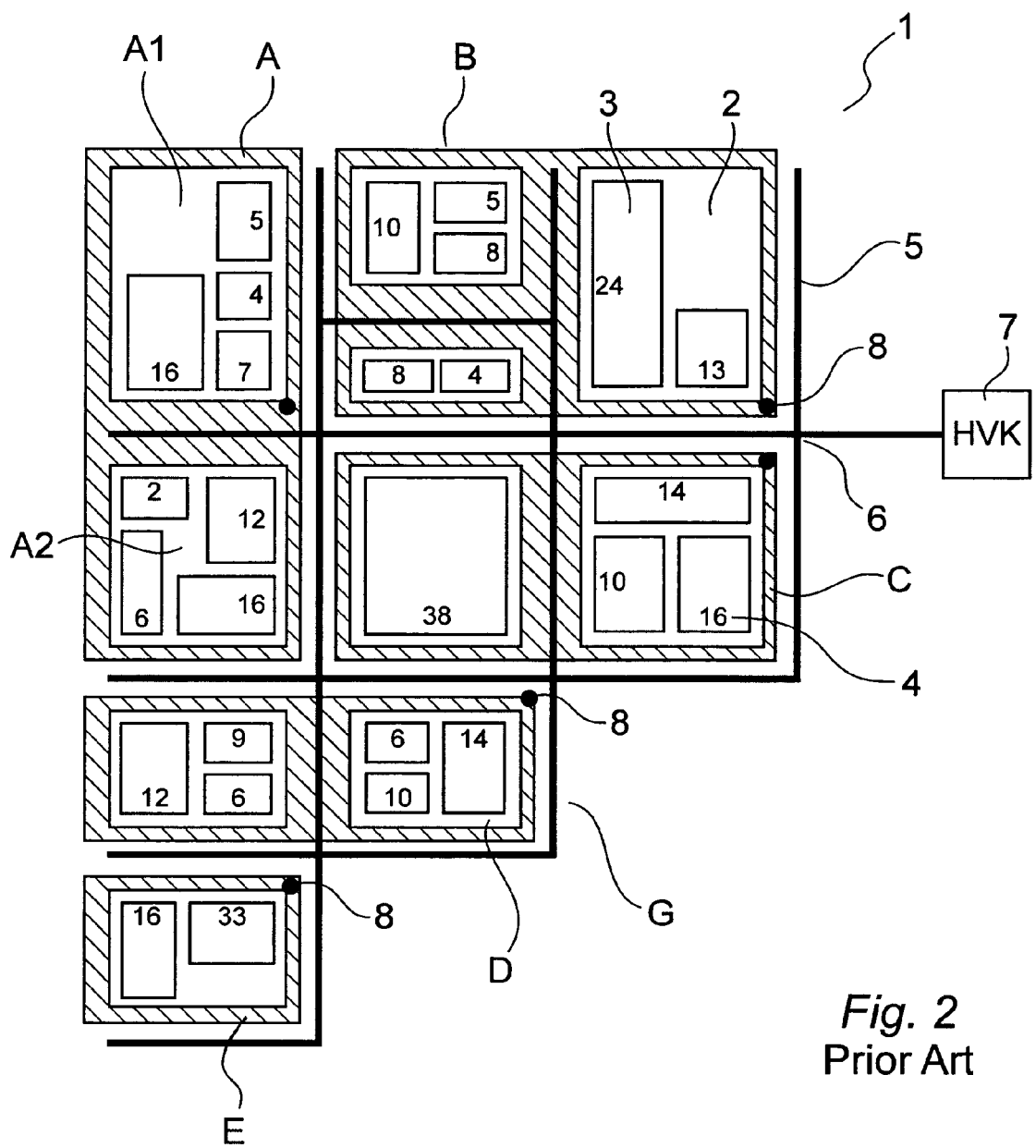
FIG. 2 shows the territory which was manually divided into areas A–E by a network planner using conventional methods.
Figure 3:
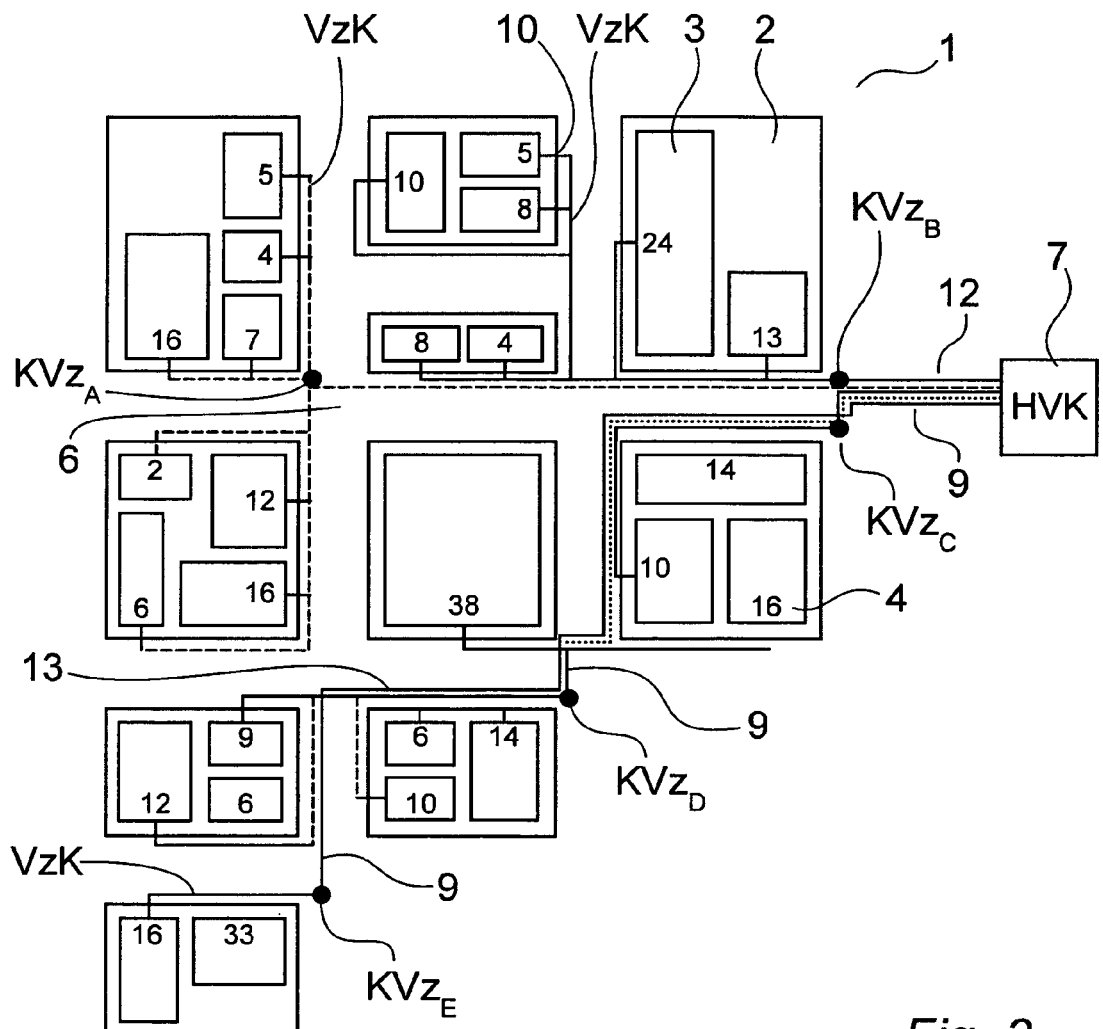
FIG. 3 shows a network plan for the territory which was drawn up manually by a network planner using conventional methods.

For territory 1 illustrated in FIG. 1, composed of city blocks 2 on which users 3 are arranged at random as well as streets and defined cable paths 5 and their intersections 6, a telecommunication network that connects territory 1 to an exchange 7 is set up using the method, as shown in FIGS. 4 through 8. For purposes of illustration, only those users 3 who need a service of the same type, such as phone lines, are provided.

Because the method can be applied as often as necessary to specific levels determined by the technologies, exchange 7 can, however, be treated like a distribution node 8.

Figure 4:
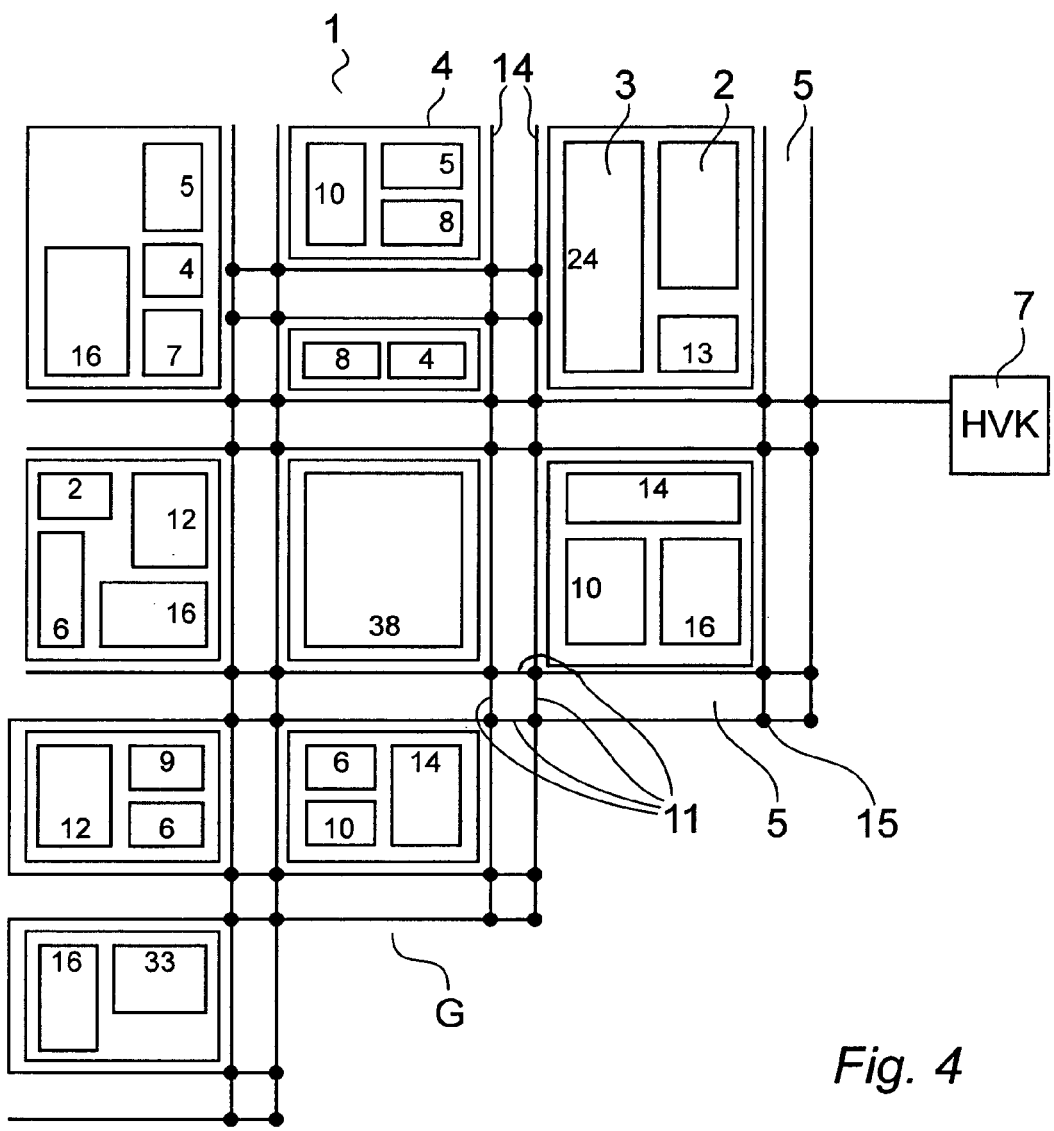
FIG. 4 shows a graph inserted into the territory using a method according to the present invention, one edge for graph being provided along each side of each street.

FIG. 4 shows a street graph which was created in process step I. It is assumed that only streets exist, and no defined cable paths. An edge 14 of graph G is assigned to each side of a street. This produces four nodes 15 at street intersections 6, a group of four street intersections 11 forming, in each case, a separate edge 14.

Figure 4A:
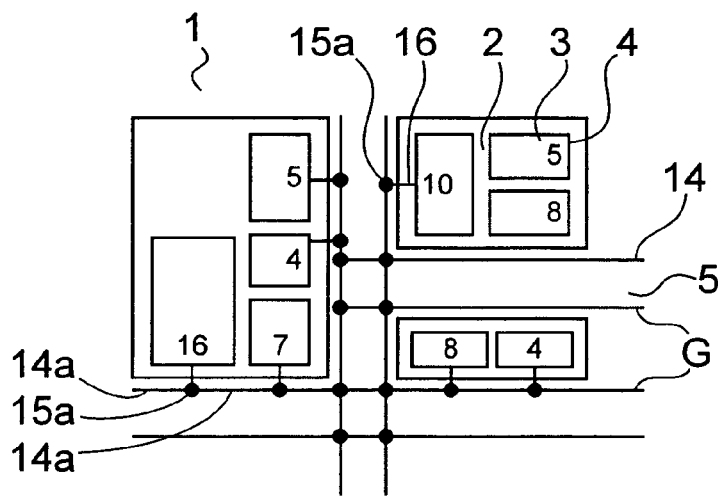
FIG. 4a shows a section of the territory illustrated in FIG. 4, in which the method according to the present invention connects the users to the graph via service edges.

In process step II, which is illustrated in FIG. 4a, users 3 are connected to graph G using service edges 16. For this purpose, either the shortest path to graph G from the junction of particular user 3 must be selected, or service edge 16 must be run along a specific route according to a particular preset parameter, thus determining the length of service edge 16. Where service edge 16 meets an edge 14 of graph G, this edge 14 is split into two edges 14a, and the junction formed by edge 14 and service edge 16 becomes a new node 15a. Edges 14a thus correspond to edges 14.

Figure 4B:
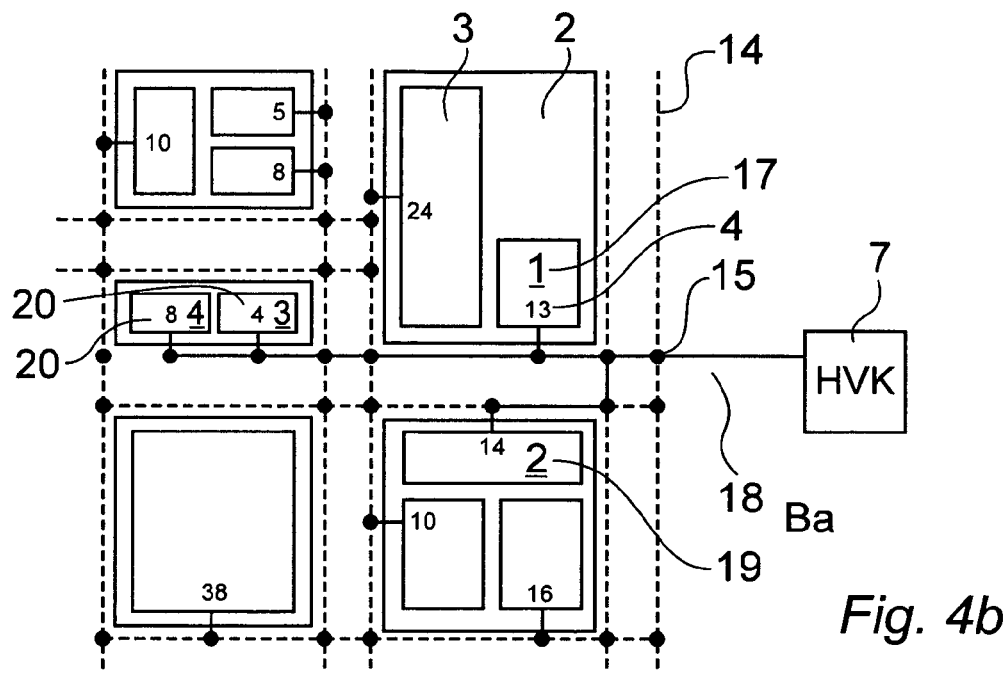
FIG. 4b shows a section of the territory in which a tree structure is created by connecting the users step by step to a portion of the tree structure already created.
Figure 4C:
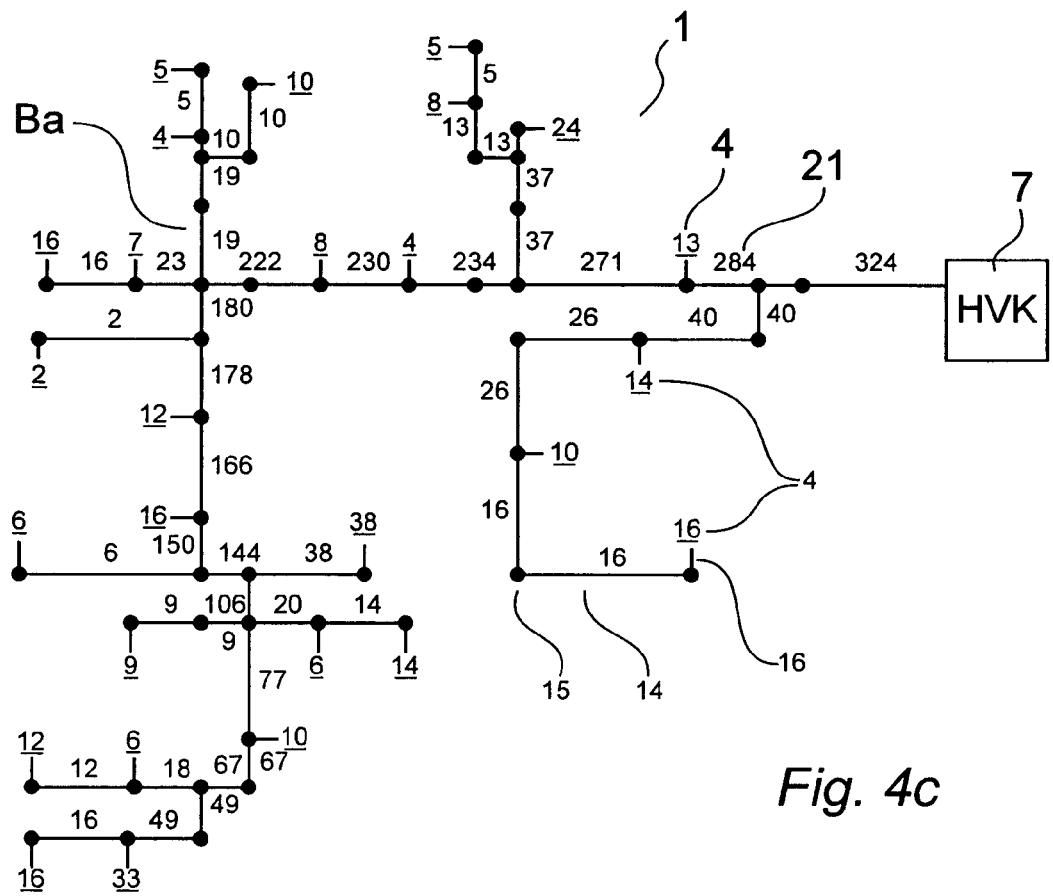
FIG. 4c shows the tree structure created for the territory using the method according to the present invention and a load assigned to the edges.

At the end of process step II, all users 3 are connected to graph G. As shown in FIGS. 4b and 4c, a tree structure Ba is generated in process step III, each user 3 being connected to exchange 7 via a separate connection, which is composed of service branches 16, edges 14, and nodes 15. For this purpose, graph G is searched for user 17 having the lowest cost of connecting to exchange 7. The connection costs are determined, for example, by the cable technology used and the cost of laying the cables, including the excavation costs. This user 17, edges 14, and nodes 15, which connect the latter to exchange 7, are then marked and form marked transmission path 18 (process step Ia). Next (process step Ib), all users 3 are connected to exchange 7 in succession so that user 19 whose cost of connecting to previously marked transmission path 18 is lower than that of all as yet unmarked users 3, is always connected to exchange 7 first, taking into account previously marked edges 14 and/or nodes 15. The located transmission path is marked along with its user. Process steps 1a and 1b are composed only of simple search algorithms and can be easily applied in the form of a computer program.

Once all users 3 have been marked, i.e., are connected generated tree structure Ba, all unmarked edges 14 and nodes 15 of graph G are eliminated. Instead of eliminating edges 14 and nodes 15, however, it is possible to use only marked edges 14 and nodes 15 for the remaining process steps. The latter variant certainly preferable from a programming standpoint.

Generated tree structure Ba is designed to minimize the connection costs (material and cable laying costs) for the defined, possible routes and cable layouts 5 in territory 1.

When designing a computer program, it can be useful to assign a load 21 to remaining edges 14 of tree structure Ba in process step IV. One possible algorithm is described below. In carrying out the method, however, it makes little difference if a different algorithm is used, and, in each case, if necessary, load 21 of edges 14 is determined in process step V.

The possible algorithm is designed so that load "0" (zero) is initially assigned to all edges 14 of tree structure Ba, moving consecutively from each user 3 to exchange 7 along edges 14 and nodes 15, adding requirement 4 of user 3, where the procedure was last started, to each edge 14 traveled.

After the optimized tree structure or route graph has been drawn up using the process steps described above, the way in which users 3 connected to tree structure Ba are combined into cable distribution areas 26 is described below (FIGS. 5 and 6), the method continuing to optimize the graph by generating as few cable distribution areas 26 as possible by utilizing the equipment as efficiently as possible.

To generate cable distribution areas 26, the capacity of the individual cable distributors supplying the individual cable distribution areas is first defined (process step Va). This capacity depends on the technology of the cable distributors used. The capacity determines the maximum number of copper pairs, glass fibers, etc. available for a cable distribution area. The maximum ranges of the transmission equipment to be used in cable distribution area 26 must also be defined, thus limiting the size of cable distribution sub-areas 23 in process step Vb).

Depending on his requirements 4, an individual user 3 can form a single cable distribution subarea 23 or even a separate cable distribution area 26, in which case the requirements can be greater than the capacity defined in process step Va). It is advisable to define these users 3, whose requirements 4 are greater than the cable distributor capacity specified in step Va, as a single cable distribution area 26, each of these users 3 being assigned enough transmission equipment to cover the user's requirements so that node 15 bordering on limit edge Gk of a user 3 of this type is assigned a requirement corresponding to a multiple of the capacity defined in step Va for new tree structure 33 to be created in process step Va), just covering the requirement of user 3; and to then remove this user 3 from tree structure Ba, the node forming the distribution center or location of the cable distributor assigned to user 3.

All markings are subsequently removed from users 3, provided that such markings were previously set.

Tree structure Ba is then searched for an as yet unmarked user 22 located at the end of a branch of tree structure Ba. This user 22 is identified by the fact that the user, along with his service edge 16, is adjacent to a node on which only one edge 14 borders. Starting from this user 22, the planner moves along service edge 16, edges 14, and node 15 in the direction of exchange 7 until reaching a limit edge Gk. A limit edge Gk is identified by the fact that it is connected to a node 15 bordering on an edge 25 whose load 21 is greater than the load defined in process step Va). An edge 14 can, however, become a limit edge Gk of a cable distribution sub-area 23 as soon as the range, starting from user 22, of the transmission equipment to be used for this cable distribution area 26 (which is also defined in process step Va)) is exceeded, even if limit edge Gk would seem to belong to cable distribution sub-area 23 based on its capacity.

FIG. 5 shows all cable distribution sub-areas 23 that are created with the method described. Note that this breakdown into cable distribution sub-areas 23 is unique and can be reproduced.

Using subsequent process steps Vf) through Vp), cable distribution sub-areas 23 are now gradually combined or transformed, if possible, into cable distribution areas 26, making sure that load 30 of combined cable distribution area 26 does not exceed the maximum capacity of cable distributor 8. At the end of these process steps, each user 3 is then clearly assigned to a cable distribution area 26.

When creating cable distribution areas 26, it should also be noted that only adjacent cable distribution subareas 23 can be combined, since the areas will otherwise lack cohesion. This would make it nearly impossible for the carrier to perform maintenance and error analysis work later on because conclusions as to the causes of errors that arise could no longer be made in the event of a malfunction. Areas are adjacent when they border on the same node 15 and lie directly against one another in a clockwise or counter-clockwise direction.

Figure 6:
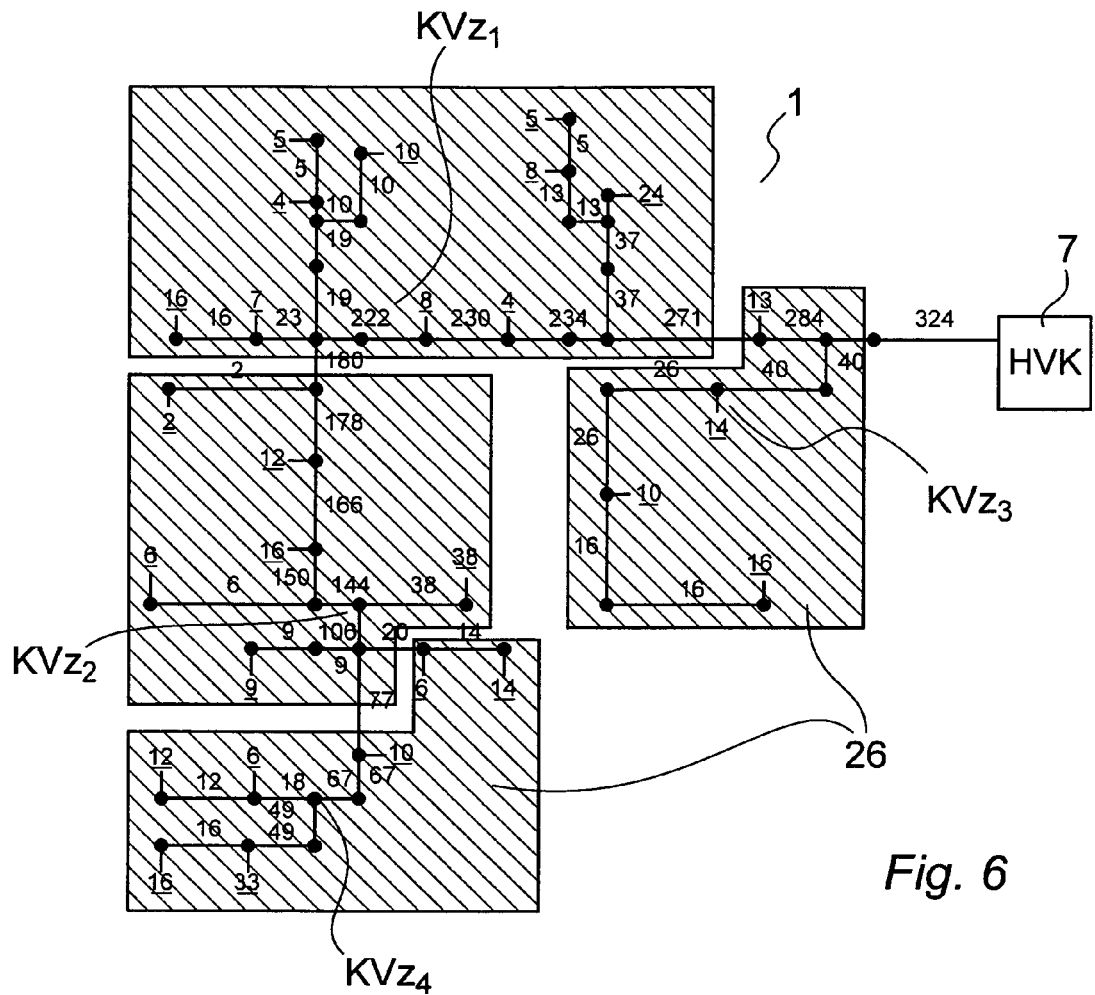
FIG. 6 shows the territory having the created cable distribution areas and cable distributors arranged in their distribution centers.
Figure 7:
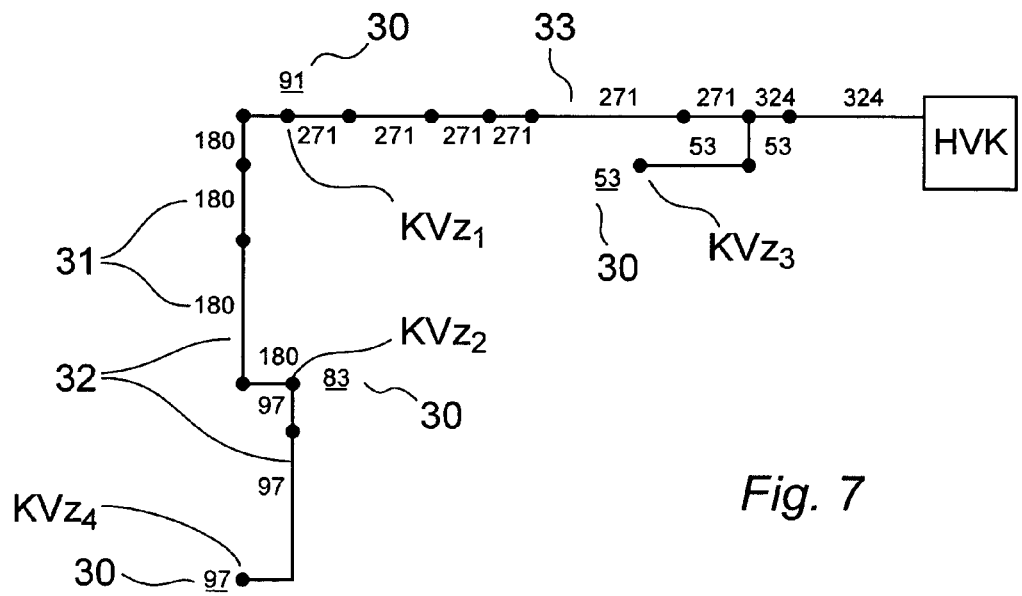
FIG. 7 shows a new tree structure created using a process according to the present invention.
Figure 8:
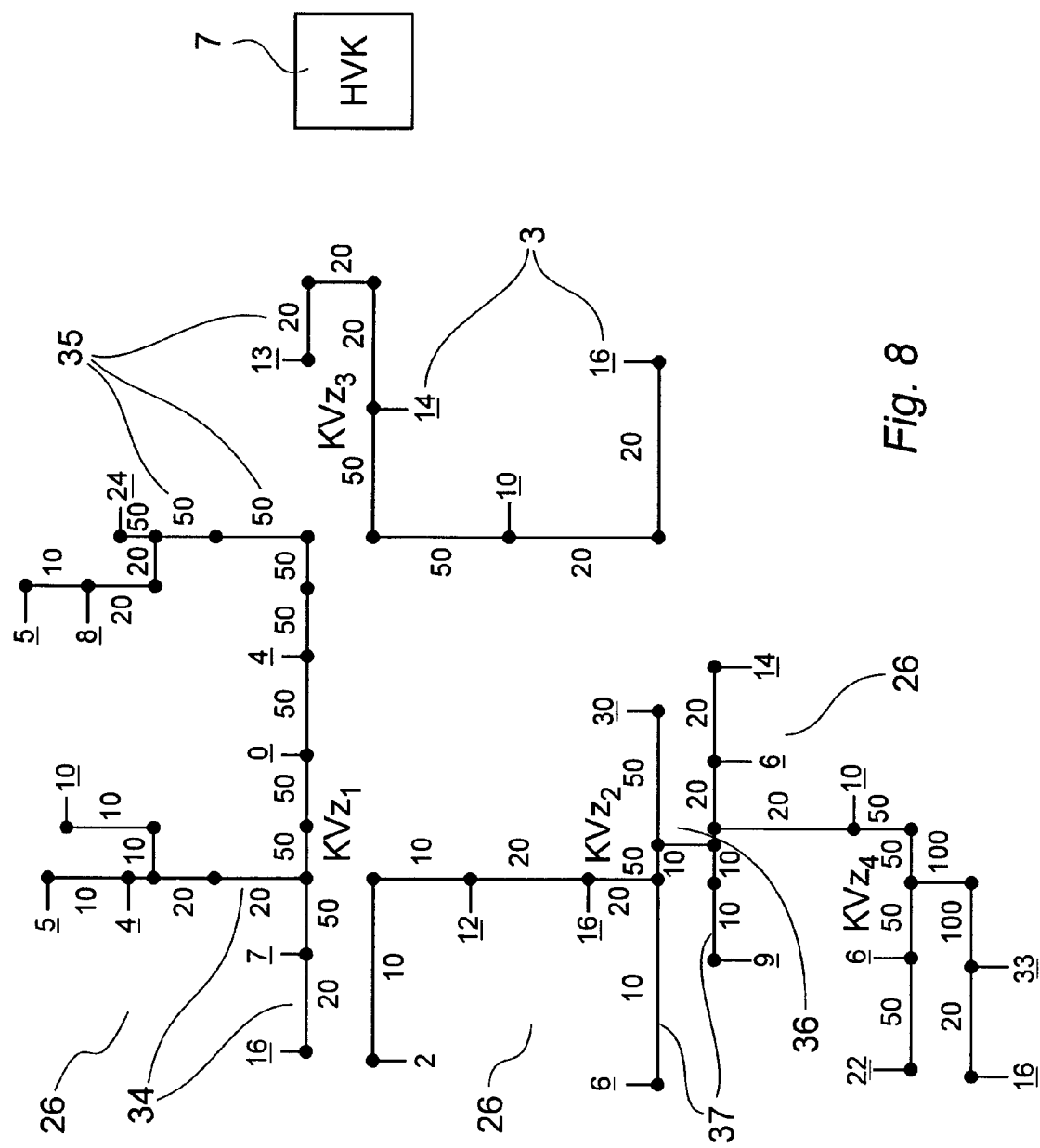
FIG. 8 shows the cable distribution areas, with pairings being assigned to individual edges or street segments.

Process steps Vf) through Vp) are explained in greater detail below with respect to FIGS. 5 and 6, FIG. 5 depicting the initial situation on which process step Vf) is based, and FIG. 6 depicting the end result after completion of process step Vp).

In process step Vf), those cable distribution sub-areas 23 in tree structure Ba are first selected which cannot be combined with any adjacent cable distribution sub-area 24 having a smaller or equivalent load, to form a larger cable distribution sub-area 23 because the total load of both adjacent cable distribution sub-areas exceeds the cable distributor capacity. These cable distribution sub-areas 23 are transformed into cable distribution areas 26 and are removed from the tree structure in process steps Vh) and Vi), the requirements of this new cable distribution area 26 being subtracted from all edges 14 connecting the latter to exchange 7 and ignored when creating the other cable distribution areas 26.

Below is a description of how cable distribution sub-areas 23 are combined into larger cable distribution sub-areas 23. As illustrated in FIG. 5, the three cable distribution sub-areas 24 are adjacent to the same node 28. None of the three cable distribution sub-areas 24 has yet been affected by the previous process steps since their requirements either do not exceed the cable distributor capacity, or the sum their capacities and that of the adjacent cable distribution subarea does not exceed the cable distributor capacity. The requirement of one cable distribution sub-area 24 can therefore be derived directly from its limit edge Gk. For example, the three cable distribution sub-areas 23 bordering on node 28 have requirements 9, 77, and 20. The sum of adjacent cable distribution sub-areas 23 yields either 86 or 97. In a subsequent process step, cable distribution sub-areas 24 are then combined into a cable distribution area 26 whose total is the largest, i.e., the two cable distribution sub-areas having a total requirement of 97. This cable distribution area 26 is now separated or removed from the tree structure and/or ignored for the remaining process steps (FIG. 5b). If more cable distribution sub-areas 24 were attached to node 28, they could also be combined. However, attention must be paid to ensuring network cohesion. In the current example, however, only one single cable distribution sub-area 24 is attached to node 28. Limit edge Gk of this cable distribution sub-area is now run in the direction of exchange 7 until its end facing away from cable distribution sub-area 23 meets next node 29, to which another cable distribution sub-area 23 is attached. Starting from this next node 29, the load of cable distribution area 26 eliminated earlier is subtracted from edges 14 in the direction of the exchange (FIG. 5c). Cable distribution sub-areas 23 continue to be combined until there are no longer any cable distribution sub-areas 23 attached to tree structure Ba. As shown in FIG. 6, the method according to the present invention is used to divide the territory into four cable distribution areas 26.

After users 3 have been assigned to created cable distribution areas 26, the individual distribution cables (VzK) connecting the cable distributors to assigned users 3 can be dimensioned. Process steps Vu) through Vw) are completed for this purpose. Process step Vu) is the first step in dimensioning. Process step Vu) is the initialization step, assigning load "0" (zero) to all edges 14, 37 of tree structure Ba. Requirement 4 of each user is then added in step v), moving along edges 14, 37 from users 3 and along node 15 to the cable distributor of cable distribution area 26 belonging to user 3. In doing this, note that the cable distributors should, if possible, be located in the distribution center of the cable distribution area, the center being mapped to the next node to prevent additional nodes from being created in the network. The distribution center is determined by the profitability of the center to be moved and can be calculated, for example, by distributing users 3 and their requirements 4. A variety of algorithms are known for determining the location of the distribution center or cable distributor, and they can also be used in the method according to the present invention.

In step Vw), a distribution cable VzK, which corresponds to a pairing and whose capacity just covers the load of edge 14, is then assigned to each edge 14, 37. This produces a network plan see (FIG. 8) for the individual cable distribution areas which immediately reveals which technology or which pairing 25 must be used for cable 34 to be laid, in order to adequately supply the users connected to that cable.

The dimensioning of individual cable distribution areas 26 is thus concluded.

Next, the cable distributors of cable distribution areas 26 must be connected to the exchange. If territory 1 is large, however, it may be necessary to provide additional distribution nodes to supply the cable distributors of cable distribution areas 26 created first and to combine distribution areas into a new network level. In both situations, process step V can be applied to the tree structure illustrated in FIG. 7, although without indicating the requirements of individual users 3, but rather the requirements of cable distribution areas 26 of the previous network level, which is selectively represented by the cable distributors attached to the tree structure. Loads 31 of the edges can again be determined, and cable distribution sub-areas as well as cable distribution areas formed on the new network level. The method can continue to be applied to this network level.

A slightly modified version of the method can also be applied to networks in which the different requirements of the users make it necessary to provide multiple pieces of equipment side-by-side on a network level, the equipment being connected to exchange 7 on the next higher or lower network level, using a single piece of equipment. At the same time, this is also taken into account when delimiting cable distribution sub-areas 23 and cable distribution areas 26.

Those skilled in the art can easily apply the described method according to the present invention to other network systems, such as a long-distance heat supply or water supply network. In these networks, the pipes are also run along routes or streets which are combined or distributed at street intersections. According to the method, these junctions are defined as nodes 15 and the pipe routes as edges 14. Exchange 7 is replaced by a main distribution node of the long-distance heat supply network. Because the requirements represent an abstract number in the method, and the long-distance heat supply requirements of the individual users can also be represented by a number, the method does not need to be changed in this regard, for example in order to apply it to a long-distance heat supply network.

LIST OF REFERENCE NUMBERS

1. Supply territory
2. City block
3. User
4. User requirements
5. Streets or defined cable path
6. Street or cable intersection
7. Main distribution node (HVK) or exchange (Vst)
8. Distribution nodes (KVZA–KVZE=cable distributors for areas A–E)
9. Cables with data lines
10. Transmission line to user
11. Street intersection with cable run underground.
12. Cable path to main distribution node.
13. Cable for area E is laid in a cable pit together with part of the cable for area D
14. Edge representing one side of a street
15. Node, junction for the edges (14)
16. Service edge to user
17. User with the lowest cost of connection to the exchange (HVK, 7)
18. Marked transmission path from the exchange (7) to the user (17)
19. User with the lowest cost of connection to marked transmission path 18
20. Users subsequently connected to the previously marked edges (14) and nodes (15) using the method
21. Load on the edges (14)
22. User in process step Vb)
23. Cable distribution sub-area
24. Cable distribution sub-areas (23) whose limit edges (Gk) are attached to the same node
25. Edge in process step Vc)
26. Cable distribution area in process step Vg)
27. Eliminated cable distribution area, process step Vh)
28. Node bordered by the limit edges (Gk) of multiple cable distribution sub-areas (23)
29. Closest node; process step Vi)
30. Requirements of a cable distribution area (26)
31. Load of edges (23)
32. Edges of the new tree structure (33) created in process step Vs)
33. New tree structure created in process step Vs)
34. Distribution cable (VzK)
35. Pairing of distribution cable (34)
36. Node shared by the two cable distribution areas 2 and 4 in which the distribution cables of both cable distribution areas run parallel
37. Edge
A–E Areas in supply territory (1)
Ba Tree structure
CuDA Copper pair
Cu-VzK Copper distribution cable
Gk Limit edge of a cable distribution sub-area (23)
Hk Main cable
HVK Exchange (7)
KVz Terminal for the distribution cable of the cable distribution area
Kvz area Cable distribution area
VzK Distribution cable (34)

What is claimed is:

1. A method for generating a network which connects all users residing within a particular territory to a main distribution node comprising the steps of:
   a) generating a network plan using the following substeps:
      i) generating a graph which represents the network and which is composed of edges and nodes, the edges representing all transmission paths in the network, wherein a length and a direction of each of the edges is determined as a function of a real topography of street segments and definable cable paths of a particular territory associated with the network, the nodes representing intersections between at least one of the street segments and the definable cable paths;
      ii) assigning the users to the graph, each of the users being connected to one of a closest edge of the edges and a closest node of the nodes via at least one service edge;
      iii) generating a tree structure by removing unnecessary edges of the edges from the graph so that only one particular connection exists between the main distribution node and each of the users, wherein the particular connection is composed of the at least one service edge, the edges and the nodes of the tree structure;
         A) determining a particular user of the users who has a first path of the transmission paths to the main distribution node along the graph which generates lowest provisioning costs compared to remaining users of the users, and marking the particular user, first edges of the edges and first nodes of the nodes which form the first path,
         B) after substep (a)(iii)(A), selecting an unmarked user of the users has a second path of the transmission paths to the main distribution node which is a most economical path, the most economical path being determined using the first edges and the first nodes, and marking the unmarked user, second edges of the edges and second nodes of the node, the second edges and the second nodes forming the second path,
         C) repeating substep (a)(iii)(B) until all of the users are marked, and
         D) removing particular edges of the edges and particular nodes of the node from the graph, the particular edges and the particular node being unmarked; and
      iv) determining at least one load of the edges of the tree structure as a function of at least one requirements for each of the users to provide the network plan; and
   b) generating the network according to the network plan.

2. A method for generating a network which connects all users residing within a particular territory to a main distribution node, comprising the steps of:
   a) generating a network plan using the following substeps:
      i) generating a graph which represents the network and which is composed of edges and nodes, the edges representing all transmission paths in the network, wherein a length and a direction of each of the edges is determined as a function of a real topography of street segments and definable cable paths of a particular territory associated with the network, the nodes representing intersections between at least one of the street segments and the definable cable paths, ii) assigning the users to the graph, each of the users being connected to one of a closest edge of the edges and a closest node of the nodes via at least one service edge, iii) generating a tree structure by removing unnecessary edges of the edges from the graph so that only one particular connection exists between the main distribution node and each of the users, wherein the particular connection is composed of the at least one service edge, the edges and the nodes of the tree structure, and iv) determining at least one load of the edges of the tree structure as a function of at least one requirements for each of the users to provide the network plan; and b) generating the network according to the network plan, wherein each street segment in the particular territory is defined by two particular edges of the edges during substep (a)(ii), each of the two particular edges representing one side of a particular segment of the street segments, wherein each of the segments is delimited and dimensioned, and the particular technology to be used for each of the edges is determined according to the following substeps:

A) defining at least one of the respective transmission capacity of cable distributors and the respective maximum range of a transmission equipment to be used for at least one cable distribution area, the capacity being determined from the transmission equipment, B) selecting to a particular user of the users having the at least one service edge which is connected to a particular node of the nodes which is connected to only one further edge of the edges, C) starting at the particular user, extending the at least one service edge, the edges and the nodes of the tree structure in a direction of an exchange to reach a limit edge, the limit edge bordering a further node of the nodes which is connected to a further edge of the edges, the further edge having a respective load exceeding at least one of the respective transmission capacity and the respective maximum range of one of the cable distributors and the at least one cable distribution area, D) marking specific users of the users which are connected to the exchange via the limit edge, and assigning each of the specific users to a respective cable distribution subarea, and E) repeating steps B) through D) until all the users are assigned to respective cable distribution subareas.

3. The method according to claim 2, wherein, after substep (E), all of the respective cable distribution subareas are recursively combined into the at least one cable distribution area so that the at least one load of each of the at least one cable distribution area does not exceed the capacity of a respective distributor of the cable distributors, and wherein each of the users is assigned to only one cable distribution area.

4. The method according to claim 2, wherein a particular subarea of the cable distribution subareas is not combinable with an adjacent subarea of the cable distribution subareas which has a particular load that is smaller or equal to the respective load of the particular subarea, and wherein the particular subarea is combined with another subarea of the at least one cable distribution area to form a larger cable distribution subarea by selecting the particular subarea from the tree structure.

5. The method according to claim 2, wherein only particular subareas of the cable distribution subareas which are directly adjacent to one another are combined into the at least one cable distribution area.

6. The method according to claim 3, further comprising the substeps of:

F) after substep (E), searching the tree structure for at least one further subarea of the respective cable distribution subareas, the at least one further subarea having a first load which is combined with a second load of a directly adjacent subarea of the respective cable distribution subareas, the second load being smaller or equal to the first load, the directly adjacent subarea having a respective limit edge which borders on a same node of the nodes of the at least one further subarea, the first load having a respective capacity which is greater than the capacity of the cable distributor, G) combining additional subareas of the cable distribution subareas which are located in the tree structure into a particular area of the at least one cable distribution area, the additional subareas excluding smallest subareas of the at least one cable distribution subarea, H) removing the additional subareas from the tree structure, and ignoring the additional subareas when generating at least one remaining area of the at least one cable distribution area to separate or ignore all of the users, the service edges, the edges and the nodes connected to the exchange by the limit edge from the tree structure, the respective load of the separated areas being subtracted from the respective load of all of the edges which connect the edges to the exchange, and J) determining if any further limit edge of the additional subareas borders a further node of the nodes which connects the separated areas to the exchange, wherein, if the further limit edges are not present, a connecting node of the nodes, further edges of the edges and further nodes of the nodes which connect the connecting node to a next node on which the further limit edge borders are removed.

7. The method according to claim 6, wherein further cable distribution areas are generated using the following substeps:

K) checking if the connecting node is connected to a single edge of the edges and to the limit edge, the respective load of the single edge being greater than all other edges which are provided in the tree structure, L) if a sum of the respective loads of the respective cable distribution subareas adjacent to the connected node is less than or equal to the capacity of the cable distributor, combining all of the respective cable distribution subareas into a further cable distribution subarea having a particular load which is equal to the sum of the respective loads, and performing substep (a)(I), M) if the sum of the respective loads is greater than the capacity of the cable distributor, combining adjacent subareas of the cable distribution subareas having largest respective loads, the largest respective load being smaller than the capacity of the cable distributor, and forming the further cable distribution subarea, N) removing the further cable distribution subarea from the tree structure, or ignoring the further cable distribution subareas when creating the at least one cable distribution area, subtracting the respective load of an eliminated area of the at least one cable distribution area from an assigned load of particular edges which connect the particular area to the exchange, if any of the respective cable distribution subareas are attached to the tree structure, performing substep (F), and ending the generation of the network if none of the cable distribution subareas are attached to the tree structure, O) assigning the respective particular edge which connects the connected node to the exchange as a further limit edge of a new cable distribution subarea, P) if the further limit edge is adjacent to a further node of the nodes on which no further limit edges border, determining a next node of the nodes on which another limit edge borders by starting from the further limit edge and extending toward the exchange, Q) if no further nodes are found in substep (P), assigning the further cable distribution subarea to the particular area of the at least one cable distribution area and completing the generation of the network, and R) connecting the limit edge of the further cable distribution subarea to the further node, and repeating substeps (F) through (O).

8. The method according to claim 2, wherein, after the at least one cable distribution area is completed, performing the following substeps:

S) determining a distribution center of each of the at least one cable distribution area in relation to a location and the requirements of each of the users who are assigned to the at least one cable distribution area, wherein one of the nodes of the at least one cable distribution area forms the distribution center and simultaneously forms a junction between the cable distribution area and the network being generated, T) assigning the respective load of the at least one cable distribution area to the distribution center, U) generating a further tree structure, marking all of the nodes and all of the edges of the tree structure generated in substep (a)(ii) which connect the distribution centers defined as nodes to the exchange, and removing or ignoring unmarked users of the users, unmarked service edges of the service edges, unmarked nodes of the nodes and unmarked edges of the edges from the further tree structure.

9. The method according to claim 6, wherein each of additional users of the users having the respective loads which are greater than the capacity of the cable distributor are defined as a single area of the at least one cable distribution area prior to completing substep (F), each of the additional users being assigned with a predetermined number of connections to cover particular requirements of each of the further users, wherein the next node is assigned with a further requirement for a further tree structure which is a multiple of the capacity to cover the requirements of each of the additional users, and each of the additional users is removed from the further tree structure, the next node forming one of the distribution center and the location of the cable distributor assigned to the next user.

* * * * *